United States Patent [19]

Liu et al.

[11] Patent Number: 6,126,702
[45] Date of Patent: Oct. 3, 2000

[54] APPARATUS AND METHOD FOR TREATING SESQUISULFATE WASTE STREAMS

[75] Inventors: Raymond Liu, Jakarta, Indonesia; James A. McCann, Walden, N.Y.; Robert L. Graff, Loveland, Ohio; Alexander K. Bonsu, Birmingham, Ala.

[73] Assignee: International Paper Company, Purchase, N.Y.

[21] Appl. No.: 09/036,820

[22] Filed: Mar. 9, 1998

[51] Int. Cl.⁷ .............. B01D 9/00; C01B 17/00; C01B 17/96; C01D 5/00
[52] U.S. Cl. ............ 23/295 R; 23/302 R; 23/302 T; 423/511; 423/544; 423/551
[58] Field of Search ............ 23/293 R, 295 R, 23/302 R, 302 T; 423/477, 478, 522, 551, 462, 511, 521, 544

[56] References Cited

U.S. PATENT DOCUMENTS

| | | | |
|---|---|---|---|
| 2,590,140 | 3/1952 | Wolf | 260/210 |
| 3,867,197 | 2/1975 | Reinhardt et al. | 134/25 R |
| 3,974,266 | 8/1976 | Fuller | 423/478 |
| 3,975,505 | 8/1976 | Fuller | 423/478 |
| 3,976,758 | 8/1976 | Fuller | 423/478 |
| 4,483,740 | 11/1984 | Parkinson et al. | 159/47.3 |
| 4,588,414 | 5/1986 | Takegami et al. | 23/295 R |
| 4,938,943 | 7/1990 | Norell | 423/478 |
| 5,116,595 | 5/1992 | Schribner et al. | 423/477 |
| 5,122,240 | 6/1992 | Cowley et al. | 204/101 |
| 5,198,080 | 3/1993 | Cowley et al. | 204/101 |
| 5,256,261 | 10/1993 | Lipsztajn et al. | 204/98 |
| 5,277,768 | 1/1994 | Twardowski | 204/101 |
| 5,283,054 | 2/1994 | Copenhafer et al. | 423/206.2 T |
| 5,376,350 | 12/1994 | Tenney et al. | 423/478 |
| 5,399,332 | 3/1995 | Pu | 423/478 |
| 5,423,959 | 6/1995 | Sundblad et al. | 204/98 |
| 5,593,653 | 1/1997 | Scribner et al. | 423/477 |

*Primary Examiner*—Tom Dunn
*Assistant Examiner*—Eileen E. Nave
*Attorney, Agent, or Firm*—Luedeka, Neely & Graham, P.C.

[57] ABSTRACT

The specification discloses an apparatus and method for treating a slurry containing sodium sesquisulfate to recover sulfate and acid constituents therefrom. The apparatus includes a treatment vessel having a separation wall delineating a clarifying zone and a mixing zone. Slurry containing sesquisulfate crystals is introduced into the mixing zone along with water and the material is mixed to promote dissolution of the crystals and formation of sodium sulfate solids. Sodium sulfate solids are collected in a lower portion of the treatment vessel and conveyed out of the vessel, and liquid from the clarifying zone is conducted from an upper end of the treatment vessel to a conventional liquid processing unit. Treatment of a sesquisulfate-containing slurry in accordance with the invention provides sodium sulfate containing little or no sesquisulfate crystals thereby reducing the need for vacuum filtration or other expensive separation techniques to recover sulfuric acid and sodium sulfate solids from the slurry.

5 Claims, 3 Drawing Sheets

APPARATUS AND METHOD FOR TREATING SESQUISULFATE WASTE STREAMS

FIELD OF THE INVENTION

This invention relates generally to the treatment of sesquisulfate waste streams to recover acid and sulfate values therefrom. More particularly, the invention relates to an apparatus and method for treating a sodium sesquisulfate ($Na_3H(SO_4)_2$)-containing waste stream from a chlorine dioxide production process to recover a sulfuric acid ($H_2SO_4$) solution and sodium sulfate solids ($Na_2SO_4$).

BACKGROUND OF THE INVENTION

Bleaching or whitening of pulp is typically accomplished by chemically altering and/or removing colored matter in the pulp and imparting a higher brightness thereto. Chlorine-based chemicals such as chlorine, chlorine dioxide and hypochlorite have been used in pulp bleaching for many years and continue to be used for removing lignin and bleaching the pulp to high brightness. Growing environmental concerns have led to an increase in the use of chlorine dioxide and nonelemental chlorine agents such as oxygen, peroxide and/or ozone in bleaching processes.

Waste streams containing sodium sesquisulfate result from the production of chlorine dioxide for use in bleaching pulp. The increasing use of chlorine dioxide in pulp mills thus makes recovery of the acid and sulfate values of such waste streams of considerable economic importance since the components recoverable from the waste streams may be recycled for a variety of uses.

One process for recovering sodium sulfate and sulfuric acid from a stream containing sodium sesquisulfate is described in U.S. Pat. No. 5,116,595 and is commonly referred to as the "R10" process. The '595 patent is specifically directed to treatment of a waste stream obtained from a process for generating chlorine dioxide for use in the pulp mill commonly known in the art as the "R8" process, and described in U.S. Pat. No. 4,081,520.

In accordance with the method described in the '595 patent, a slurry containing sulfuric acid and sodium sesquisulfate is filtered, contacted with water, and thereafter filtered again to separate the resulting sodium sulfate precipitate from the sulfuric acid solution. One significant disadvantage of recovery processes of this type is that they require filtration techniques, typically vacuum filtration techniques, and the concomitant equipment and operational costs associated with these filtration steps. However, such filtration techniques have been considered vital to achieving sulfate solids of satisfactory yield.

Accordingly, it is an object of the present invention to provide a method and apparatus for treating a sesquisulfate-containing stream to recover valuable constituents thereof.

It is an additional object of the invention to provide an apparatus and method for treating a sesquisulfate stream to recover acid and sulfate values of the stream.

Another object of the invention is to provide an apparatus and method for treating a sodium sesquisulfate-containing waste stream to recover a sulfuric acid solution and a sodium sulfate solids.

A further object of the invention is to provide an apparatus and method of the character described which avoids or limits the need for mechanical filtration such as vacuum filtration.

Still another object of the invention is to provide an apparatus and method of the character described which is uncomplicated and economical as compared to conventional methods and which does not compromise the quality or quantity of the yield.

SUMMARY OF THE INVENTION

With regard to the foregoing and other objects, the invention provides an apparatus for treating a slurry containing sodium sesquisulfate crystals to recover sulfate and acid constituents therefrom. In general, the apparatus includes an upright treatment vessel having an upper end and a lower end and a separation wall defining on one side a mixing zone and on another side a clarifying zone. The separation wall includes a lower edge spaced above the lower end of the vessel to enable fluid flow communication between the mixing zone and the clarifying zone by flow of liquid under the lower edge between the zones.

A collector is located within the treatment vessel generally below the mixing zone and includes an upwardly opening reservoir for collecting solid particles descending by gravity from the mixing zone. A diffuser in the reservoir of the collector is connected in flow communication with a source of pressurized gas for releasing a flow of gas bubbles through solid particles collected in the reservoir to agitate particles contained therein, and to provide a flow of gas bubbles up through the mixing zone to promote a turbulent mixing flow regime within the mixing zone for dissolution of sodium sesquisulfate crystals and formation of sodium sulfate solids.

An inlet conduit is connected in flow communication with the mixing zone for delivering the slurry into the mixing zone. A water inlet is provided for introducing water into the mixing zone for mixing with the slurry.

An outlet conduit adjacent the upper end of the treatment vessel is provided for directing liquid from the clarifying zone to a conventional liquid processing unit. A solids outlet is provided adjacent the lower end of the treatment vessel for directing sodium sulfate solids out of the vessel.

In a preferred embodiment, the separation wall is provided by an upright elongate cylindrical conduit generally centrally located within the treatment vessel. The mixing zone is defined within the conduit as an elongate upright cylindrical columnar space and the clarifying zone is defined outside of the conduit as an elongate upright annular space between the conduit and the inner wall of the vessel. The lower edge of the wall is defined as the lower continuous edge of a generally conical, downwardly opening flow expansion member on the conduit.

The invention also provides a method for treating a slurry containing sodium sesquisulfate crystals to recover a sodium sulfate solids therefrom. In accordance with the method, the slurry is conducted through an elongate generally upright mixing zone in a treatment vessel and is mixed therein to promote dissolution of the crystals and formation of sodium sulfate solids. The slurry is then conducted to a clarifying zone.

Sesquisulfate crystals descending from the mixing zone are collected in the reservoir of a collector located beneath the mixing zone. Gas is bubbled through the crystals in the reservoir to promote dissolution thereof and to provide a flow of gas bubbles ascending through the mixing zone to promote a turbulent flow regime therein and consequent mixing of the slurry. Sodium sulfate solids descending from the slurry in the clarifying zone are collected and conducted out of the vessel along with entrained liquid consisting principally of sulfuric acid and water. The balance of the liquid from the clarifying zone is conducted out of the vessel along with a small amount of entrained solids consisting principally of sodium sulfate.

Treatment of a sesquisulfate-containing stream in accordance with the invention yields an effluent containing sulfuric acid, water and a small amount of dissolved sodium sulfate and a sodium sulfate solids product with entrained sulfuric acid containing little or no sesquisulfate crystals, limiting the need for vacuum filtration and other expensive, complicated separation techniques.

BRIEF DESCRIPTION OF THE DRAWINGS

The above and other features and aspects of the present invention will become further known from the following detailed description considered in conjunction with the accompanying drawings in which.

DETAILED DESCRIPTION

Figure 1:
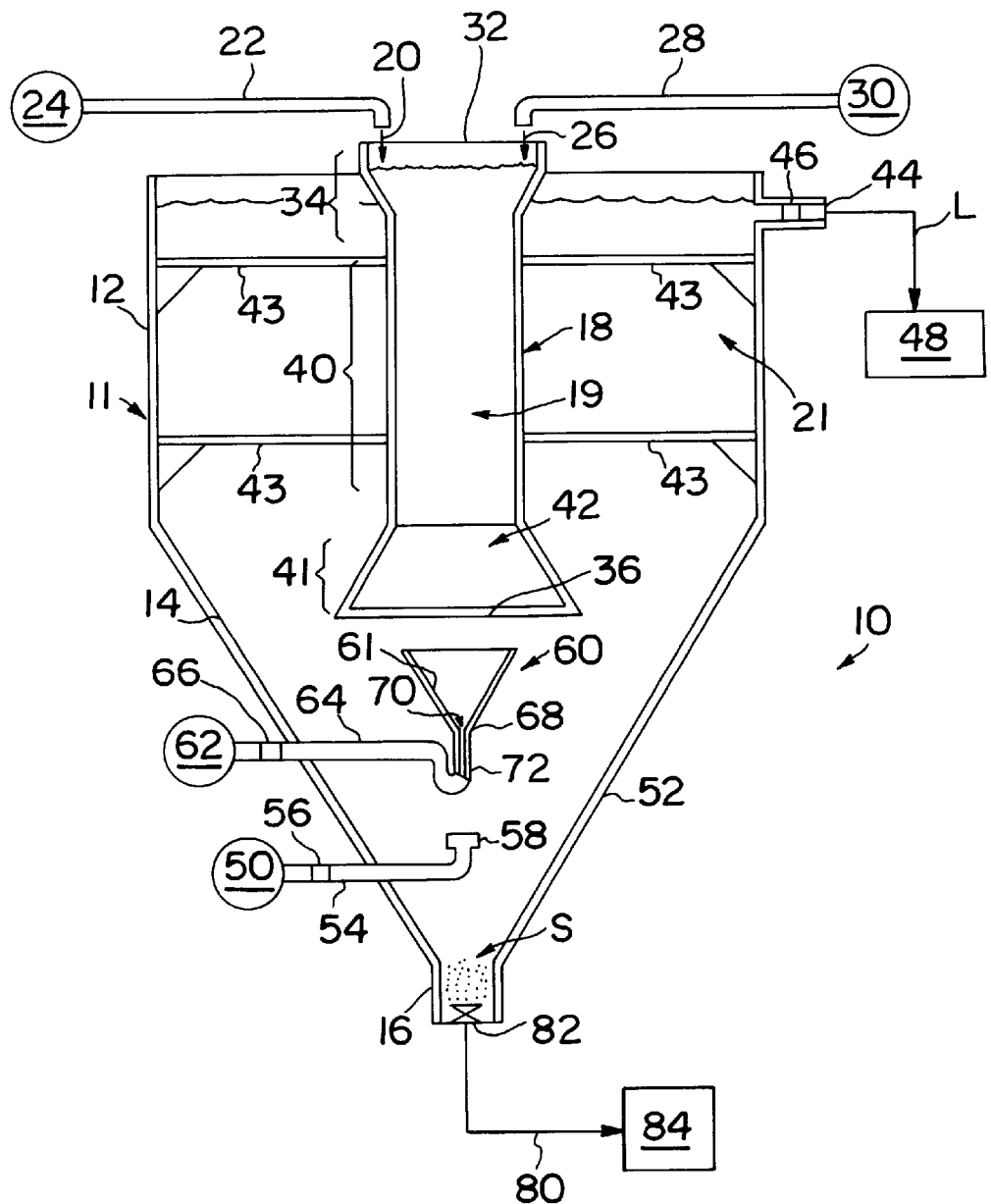
FIG. 1 is a cross-sectional view of a preferred embodiment of an apparatus for treating sodium sesquisulfate in accordance with the present invention.

With initial reference to FIG. 1, there is shown a preferred embodiment of a separator 10 in accordance with the invention for continuously treating waste streams containing sodium sesquisulfate crystals ($Na_3H(SO_4)_2$) to recover acid and sulfate constituents thereof, namely, a sulfuric acid ($H_2SO_4$) solution and sodium sulfate solids ($Na_2SO_4$).

In general, a waste stream containing sesquisulfate crystals is introduced into the separator 10 and treated to yield a sulfuric acid solution effluent L and sodium sulfate solids S. The effluent L will generally contain water, sulfuric acid and a small amount of sodium sulfate solids. The solids S will generally contain principally sodium sulfate solids (i.e., crystalline anhydrous neutral sodium sulfate), along with from about 2 to about 10 wt. % sulfuric acid at a normality of from about 0.2 N to about 1.5 N and it may contain a small amount of sodium sesquisulfate crystals.

The fluid-contacting surfaces of separator 10 are preferably made of conventional materials such as stainless steel or a polymer-lined or polymeric material suitable for the processing materials such as sodium sesquisulfate and sulfuric acid. As will be explained below, the separator is configured to provide several zones which cooperate to accomplish the desired treatment of the sesquisulfate stream.

In a preferred embodiment, separator 10 includes an upright vessel 11 having a generally cylindrical upper portion 12, a generally funnel or inverted cone-shaped middle portion 14 and a generally cylindrical lower neck portion 16. The separator 10 also includes an upright elongate generally cylindrical conduit 18 defining a mixing zone 19 for treating a sodium sesquisulfate slurry 20 provided through conduit 22 from a waste source 24 such as a waste stream in a pulp mill. Conduit 18 provides a separation wall for separating mixing zone 19 from a clarifying zone 21.

Water 26 for a dilution of the slurry 20 is provided through conduit 28 from a water source 30. The slurry conduit 22 and water conduit 28 are provided with suitable flow control valves and pumps of a type known in the art for controlling the flow of slurry 20 and water 26 to the mixing zone 19.

Conduit 18 includes an inlet opening 32 adjacent an upper portion 34 thereof for receiving the slurry 20 and water 26 into the mixing zone 19. The conduit 18 also contains a lower edge 36 spaced above the lower neck portion 16 of the vessel 11 to enable fluid flow communication between the mixing zone 19 and clarifying zone 21. In the illustrated embodiment, liquid from the mixing zone 19 together with entrained solids flows under the lower edge 36 of the conduit 18 into the clarifying zone 21.

Conduit 18 preferably has an elongate central cylindrical portion 40 and a lower conical portion 41, and is generally centrally located within the treatment vessel 11. By virtue of this arrangement, clarifying zone 21 is defined as a generally annular space between the outer surface of conduit 18 and the inner surface of the upper portion 12 of vessel 11 and, moving downwardly from upper portion 12, converges or is narrowed according to the shape of middle position 14 to neck portion 16 so as to funnel solid particles descending through zone 21 to the bottom-most portion of vessel 11. Conical portion 41 of conduit 18 expands the flow area of material moving down through the conduit thereby decelerating the material and providing a transition zone 42 before the slurry is released into clarifying zone 21.

Conduit 18 may be supported within vessel 11 by any suitable means such as a plurality of horizontally spaced apart radially extending bars or rods 43 connected in supporting relation between the outer surface of conduit 18 and the inner surface of the upper portion 12 of vessel 11.

As will be explained more fully below, the sesquisulfate stream is preferably contacted with water in the mixing zone 19 under conditions which promote dissolution of sodium sesquisulfate crystals to sodium sulfate solids. In this regard, and without being bound by theory, it is believed that the sesquisulfate crystals dissolve in the water with the sulfate saltcake forming as a precipitate.

Water 26 is preferably introduced into the zone 19 with the sesquisulfate slurry 20 as previously described and/or water is flowed upwardly into the lower portion 41 of the mixing zone 19 to promote substantially turbulent conditions in the mixing zone 19 along with dilution of the slurry.

As used herein, the term "turbulent" is a relative term and will be understood to refer generally to non-stagnant fluid conditions so as to promote dissolution of the sesquisulfate crystals. Those of ordinary skill will recognize that consistent with the aim of the invention to promote dissolution of the sesquisulfate crystals in the slurry fed to the separator 10, a sufficient turbulence is applied in the mixing zone 19 to substantially accomplish this objective. The degree of turbulence will vary depending on the circumstances of feed concentration, temperature, vessel dimensions and the like and may be determined in the exercise of ordinary skill as appropriate to accomplish the invention objectives on a case-by-case basis.

The treated slurry emerging from the mixing zone 19 containing sodium sulfate solids, sulfuric acid and/or water discharges into the less turbulent clarifying zone 21 thereby promoting descension of sodium sulfate solids which settle in the lower neck portion 16 of the vessel 11 and accumulate as solids S which are discharged from the vessel 11. The liquid effluent L in clarifying zone 21 is discharged from the separator 10 through conduit 44 in the upper cylindrical portion 12 of the vessel 11. A control valve 46 controls the flow of effluent L from the separator 10 so that a substantially constant flow is maintained. The effluent L from the separator 10 is conducted to a conventional treatment system 48 for concentration of sulfuric acid, removal of any entrained solids and recycle to the mill.

Additional water from a source 50 may be introduced into the lower portion 52 of the vessel 11 via a conduit 54 and associated valve 56 for further dilution of slurry 20. A flow distributor 58 is preferably provided on the end of the conduit 54 to direct a diffused flow of water in a generally upwardly and radially outward direction into the clarifying zone 21.

Figure 2:
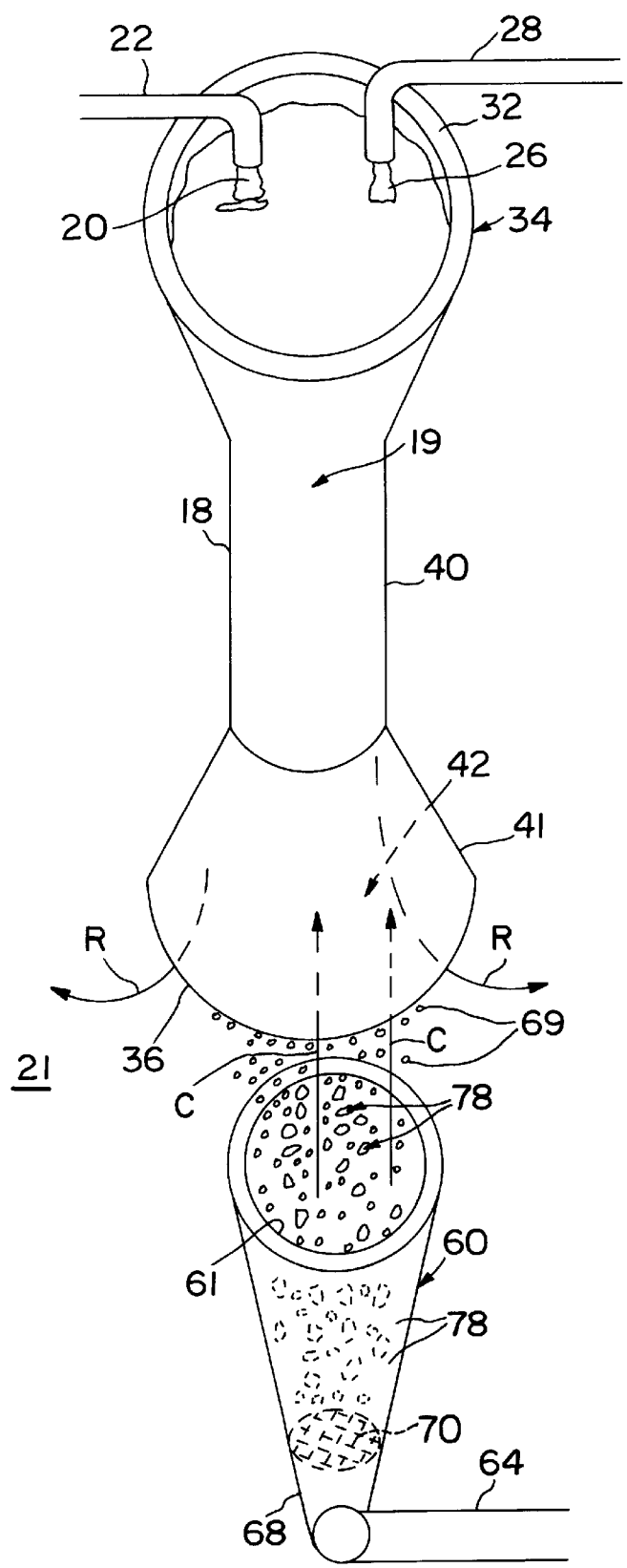
FIG. 2 is a perspective view of a preferred embodiment of a mixing conduit and collector for use in practicing the invention.

With additional reference to FIG. 2, a generally inverted cone-shaped collector 60 is preferably provided in the separator 10 positioned below mixing zone 19 adjacent the middle portion 14 of the separator in substantial vertical alignment with and spaced below lower conical portion 41 of the conduit 18. Collector 60 defines an upwardly opening reservoir 61 therein for intercepting and collecting undissolved sodium sesquisulfate crystals 78 which descend from transition zone 42. The diameter and configuration of the opening of reservoir 61 defined by collector 60 preferably corresponds substantially to that of the central cylindrical portion 40 of conduit 18 to catch a substantial portion of the relatively large sodium sesquisulfate crystals 78 descending from the conduit.

To further promote mixing and dissolution of sesquisulfate crystals within mixing zone 19, a flow of gas such as air from a source of pressurized gas 62 is preferably emitted from collector 60 at a rate of from about 10 to about 80 cubic meters per ton of sesquisulfate via a gas inlet conduit 64 which doubles as a support for collector 60. Gas flow may be regulated as by flow control valve 66.

Gas inlet conduit 64 is preferably connected to the collector 60 at its base 68 in order to introduce a flow of gas bubbles 69 upwardly through the reservoir 61. As will be appreciated, a flow of gas bubbles from collector 60 moves generally in the direction indicated by arrows C up through the mixing zone 19 to promote turbulence which aids in dissolution of sesquisulfate crystals therein. In this connection, it is further noted that expanded conical portion 41 of conduit 18 serves to collect gas bubbles 69 ascending from collector 60 into the mixing zone 19. Accordingly, the lower edge 36 of conical portion 41 is preferably dimensioned and positioned so that the conical portion 41 in the manner of a hood substantially envelopes and thus captures bubbles ascending from collector 60, while decelerating the downward flow of material from central portion 40 of the mixing zone 19 and also accelerating the flow of bubbles 69 through the transition area for an enhanced mixing effect.

A screen 70 is preferably provided at the base 68 of the collector 60 in reservoir 61 to diffuse the flow of gas into the small bubbles 69 and to limit entry of solids into the conduit 64. Conduit 64 also preferably includes a U-shaped bend or trap 72 to collect solids which may enter the conduit 64 and to limit further migration of solids in the conduit 64.

Thus, it will be appreciated that in operation sesquisulfate and water introduced into upper portion 34 of the conduit 18 flows downwardly through mixing zone 19 toward the lower portion 41 countercurrently with the upward flow of bubbles 69. In this connection, it is noted that upper portion 34 of conduit 18 is preferably flared outwardly at the inlet opening 32 thereof so as to funnel the entering water and sodium sesquisulfate slurry toward the central portion 40 of the conduit 18 to promote integration and mixing of the water and sesquisulfate therein. Additional mixing in zone 19 may be provided by flights projecting into the zone and/or one or more motor-driven impellers.

It has been found that the substantially turbulent mixing of sesquisulfate stream and water in accordance with the invention promotes a dissolution of the crystals in the water. However, some portion of the sesquisulfate crystals, particularly the larger crystals, may not fully dissolute prior to exiting the mixing zone 19. Accordingly, collector 60 is positioned below the lower portion 41 of the conduit 18 to intercept and collect a substantial portion of such undissoluted crystals 78. It is noted that the larger of these crystals 78 may tend to stay within the reservoir 61 of collector 60 and undergo repeated rising and falling, colliding with other particles, and that as these crystals grow smaller, they may become entrained and carried back into the mixing zone 19 by the bubbles 69 eventually dissoluting and settling as sodium sulfate solids S.

Material exiting the mixing zone 19 (excepting solids setting into collector 60) enters the clarifying zone 21 as indicated by arrows R. As the material flows out of the mixing zone 19 through transition zone 42 it expands radially and its velocity decreases. Sodium sulfate solids descend within the relative calm of the clarifying zone 21 under the influence of gravity and collect as solids S in the lower neck portion 16 of vessel 11. Substantially solids-free liquid effluent rises through the clarifying zone 21 from the lower edge 36 of the conduit 18 and is directed out of vessel in conduit 44. Thus, an increasing solids gradient will generally be observed moving downwardly through clarifying zone 21.

Solids S may be removed from separator 10 via a solids effluent outlet delivery conduit 80 and associated control valve 82 located adjacent the lower neck portion 16 of the separator 10 and thereafter further processed using conventional recovery techniques in a recovery unit indicated generally at 84 to recover sodium sulfate substantially free of entrained sulfuric acid. Outlet delivery conduit 80 may be any conventional wet solids conveyance apparatus such as a screw conveyor or the like.

Figure 3:
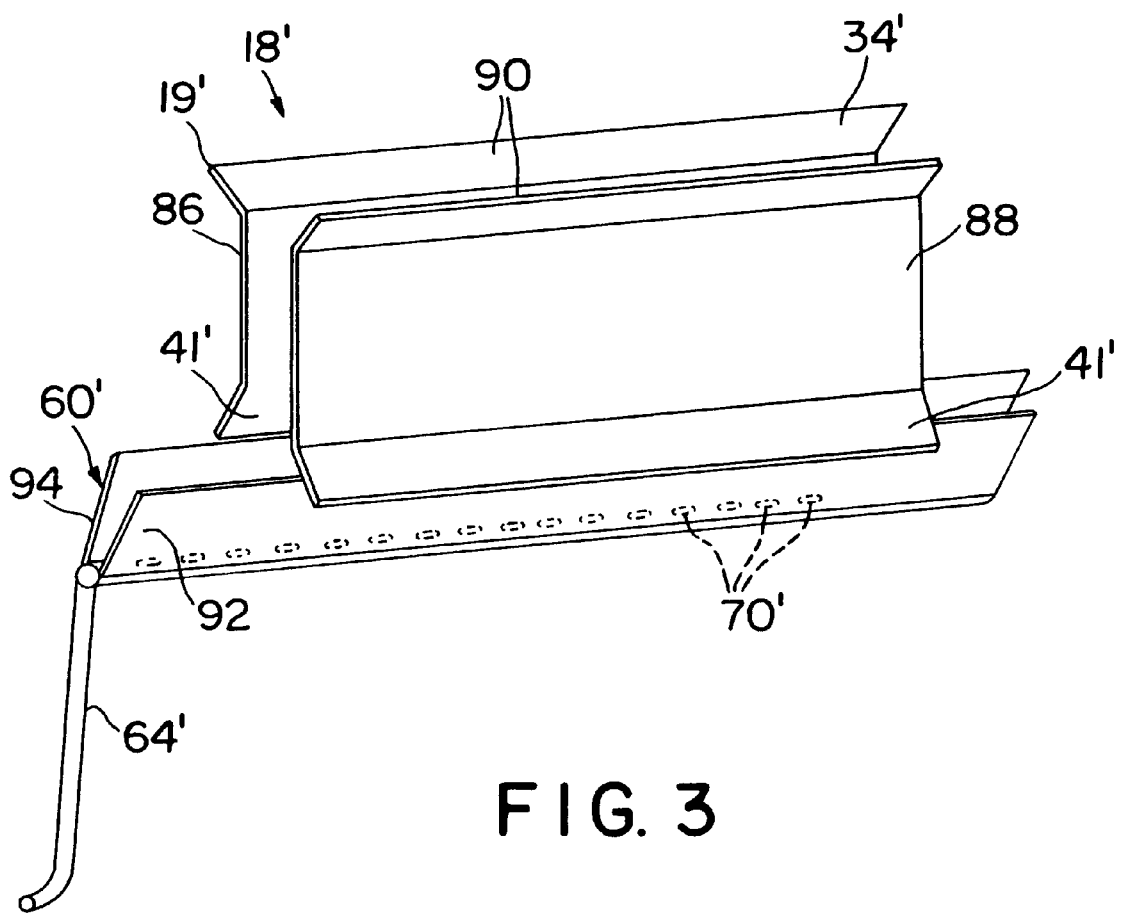
FIG. 3 is a perspective view of another embodiment of a mixing conduit and collector for use in practicing the invention.

It is further noted that separator 10 may be provided in various geometrical configurations without deviating from the spirit of the invention. For example, FIG. 3 shows an alternate configuration for conduit 18, designated 18', and for the collector 60, designated 60'. As can be seen, conduit 18' includes upper and lower portions 34' and 41' provided by spaced-apart elongate panel members 90 which angle outwardly from a pair of uniformly spaced apart upright panel members 86 and 88 which define between them mixing zone 19'. Likewise, the collector 60' is provided by a pair of side panel members 92 and 94 which angle outwardly from a slotted tube or screen 70' in flow communication with a conduit 64' for delivering air bubbles from the collector 60' up into the mixing zone 19' in a manner substantially equivalent to that described previously.

With respect to the operation of the separator 10 according to the invention, the sodium sesquisulfate slurry treated in the separator 10 may be a waste stream from a pulp mill which contains sodium sesquisulfate crystals, e.g., such as may be produced during the generation of chlorine dioxide for use in the mill. Such waste streams typically contain from about 30 to about 80 percent by weight solids, most typically about 80 weight percent solids, which solids consist primarily of sodium sesquisulfate crystals and sodium sulfate solids. By volume, the slurry typically contains from about 2 to 3 parts sodium sesquisulfate crystals per 1 part sulfuric acid and such feed typically has an acid normality of from about 0.5 to about 4.8 N.

The sesquisulfate slurry introduced into the mixing zone 19 via the conduit 20 preferably has a temperature of from about 20° C. to about 60° C. and water introduced into the mixing zone 19 via conduits 28 and 54 preferably has a temperature of from about 20° C. to about 100° C. If necessary, the incoming streams may be passed through one or more heat exchangers to obtain the desired inlet temperatures.

In an exemplary embodiment water is conducted to the mixing zone 19 via the conduit 28 at a rate of from about 0 liter/Kg sesquisulfate to about 0.5 liter/Kg sesquisulfate and via the conduit 54 at a rate of from about 0.1 liter/Kg sesquisulfate to about 1 liter/Kg sesquisulfate. It is preferred that the amount of water and sesquisulfate introduced be controlled such that the ratio of the total weight of water to the total weight of sesquisulfate is from about 0.6 to about 1.0, preferably from about 0.7 to about 0.9 and the slurry diluted by a factor of from about 0.2 to about 0.5.

As will be appreciated, the invention offers economic advantages over conventional processes and apparatus which involve the use of expensive vacuum filtration equipment. By avoiding or limiting the use of such equipment, considerable savings may be achieved without sacrificing the quality or quantity of the yield.

The foregoing description of certain embodiments of the present invention has been provided for purposes of illustration only, and it is understood that numerous modifications or alterations may be made without departing from the spirit and scope of the invention as defined in the following claims.

What is claimed is:

1. A method for treating an aqueous slurry containing sodium sesquisulfate crystals to recover sodium sulfate therefrom which comprises:

conducting the slurry through an elongate generally upright mixing zone in a treatment vessel and mixing the slurry in the mixing zone to promote dissolution of the crystals and formation of sodium sulfate solids;

conducting the slurry from the mixing zone to a separate clarifying zone so that sodium sulfate solids are carried in the slurry from the mixing zone toward the clarifying zone and sesquisulfate crystals within the slurry descend from the mixing zone toward the clarifying zone;

collecting undissolved sesquisulfate crystals descending from the mixing zone in a reservoir of a collector located beneath the mixing zone so as to intercept and collect sesquisulfate crystals descending from the mixing zone toward the clarifying zone, preventing the collected sesquisulfate crystals from entering into the clarifying zone;

bubbling gas through the collected sesquisulfate crystals to promote dissolution of the crystals and to provide a flow of gas bubbles ascending through the mixing zone to promote a turbulent flow regime therein and to assist in mixing of the slurry in the mixing zone;

collecting sodium sulfate solids descending from the slurry in the clarifying zone;

conducting the collected sodium sulfate solids out of the vessel from the clarifying zone along with entrained liquid consisting principally of sulfuric acid and water; and conducting liquid from the clarifying zone out of the vessel along with a small amount of entrained solids consisting principally of sodium sulfate.

2. The method of claim 1 further comprising adding water to the mixing zone to promote dissolution of the sodium sesquisulfate crystals therein.

3. The method of claim 2 wherein the ratio of water added to the amount of the sesquisulfate slurry is within the range of from about 0.6 to about 1 liter of water per kilogram of sesquisulfate slurry.

4. The method of claim 2 wherein the ratio of water added to sesquisulfate provided to the mixing zone is within the range of from about 0.7 to about 0.9 liter of water per kilogram of sesquisulfate slurry.

5. The method of claim 2 wherein the water has a temperature within the range of from about 20° to about 100° C.

* * * * *